(12) United States Patent
King et al.

(10) Patent No.: US 8,615,554 B1
(45) Date of Patent: Dec. 24, 2013

(54) ELECTRONIC MAIL DELIVERY PHYSICAL DELIVERY BACKUP

(75) Inventors: Linda Giessel King, San Antonio, TX (US); Christopher Andrew Sandoval, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 799 days.

(21) Appl. No.: 12/103,901

(22) Filed: Apr. 16, 2008

(51) Int. Cl.
  *G06F 15/16* (2006.01)

(52) U.S. Cl.
  USPC .......................................... 709/206; 709/204

(58) Field of Classification Search
  USPC ................................................. 709/204, 206
  See application file for complete search history.

(56) References Cited

U.S. PATENT DOCUMENTS

| | | | |
|---|---|---|---|
| 6,604,132 B1* | 8/2003 | Hitt | 709/206 |
| 6,854,007 B1* | 2/2005 | Hammond | 709/206 |
| 6,877,136 B2* | 4/2005 | Bess et al. | 715/209 |
| 6,999,993 B1* | 2/2006 | Shah et al. | 709/207 |
| 7,199,906 B1* | 4/2007 | Tamura | 358/400 |
| 7,461,129 B2* | 12/2008 | Shah et al. | 709/207 |
| 7,602,517 B2* | 10/2009 | Tamura | 358/1.15 |
| 2003/0009529 A1 | 1/2003 | Powers | |
| 2003/0041141 A1 | 2/2003 | Abdelaziz et al. | |
| 2003/0074411 A1 | 4/2003 | Nale | |
| 2003/0105759 A1* | 6/2003 | Bess et al. | 707/9 |
| 2004/0044734 A1 | 3/2004 | Beck | |
| 2006/0010218 A1* | 1/2006 | Turcotte | 709/206 |
| 2006/0106942 A1* | 5/2006 | Shan et al. | 709/240 |
| 2006/0242247 A1* | 10/2006 | Richardson | 709/206 |
| 2010/0217979 A1* | 8/2010 | Yaghmour | 713/168 |

* cited by examiner

*Primary Examiner* — Mohamed Wasel
(74) *Attorney, Agent, or Firm* — Brooks, Cameron & Huebsch, PLLC

(57) ABSTRACT

An electronic communication such as electronic mail (email) may be sent to a recipient through a network and may be monitored for delivery success. The email may contain information regarding generation and delivery of a physical document to the recipient. If the email is not delivered to the recipient's electronic address or is not opened by the recipient, a physical document may be generated and delivered to the recipient's physical address.

14 Claims, 7 Drawing Sheets

ELECTRONIC MAIL DELIVERY PHYSICAL DELIVERY BACKUP

CROSS-REFERENCE TO RELATED APPLICATIONS

This application is related by subject matter to that disclosed in the following commonly assigned applications, the entirety of which are hereby incorporated by reference herein: U.S. patent application Ser. No. 12/103,894, and U.S. patent application Ser. No. 12/103,887, each filed on Apr. 16, 2008 and each entitled "Electronic Mail Delivery With Physical Delivery Backup."

BACKGROUND

Electronic mail or email is a store and forward method of composing, sending, storing, and receiving messages over electronic communication systems. Email tracking is directed to techniques for monitoring email delivery to an intended recipient. Email traditionally provides no mechanism for tracking a sent message. The system(s) involved will generally make an effort to either deliver mail or return a failure notice ("bounce message"), but there is no guarantee that a message will actually be delivered, let alone read by the recipient. It is difficult to confirm electronic delivery or verification of an electronic communication such as an email with high reliability. This is in contrast to the postal mail system, which offers registered mail or other forms of tracking and tracing.

SUMMARY

An electronic communication such as electronic mail (email) may be sent to a recipient through a network and may be monitored for delivery success. The email may contain information regarding generation and delivery of a physical document to the recipient. If the email is not delivered to the recipient's electronic address or is not opened by the recipient, a physical document may be generated and delivered to the recipient's physical address.

In an implementation, a common carrier may receive instructions from a user and generate and send the email to the recipient. The user and/or the common carrier may be apprised of the delivery success of the email. The email may be certified or otherwise trusted.

In an implementation, a common carrier, who may have decentralized distributions centers, may generate the physical document and/or may deliver the physical document to the recipient. The physical document may be sent as a certified document to the recipient.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings.

DETAILED DESCRIPTION

Figure 1:
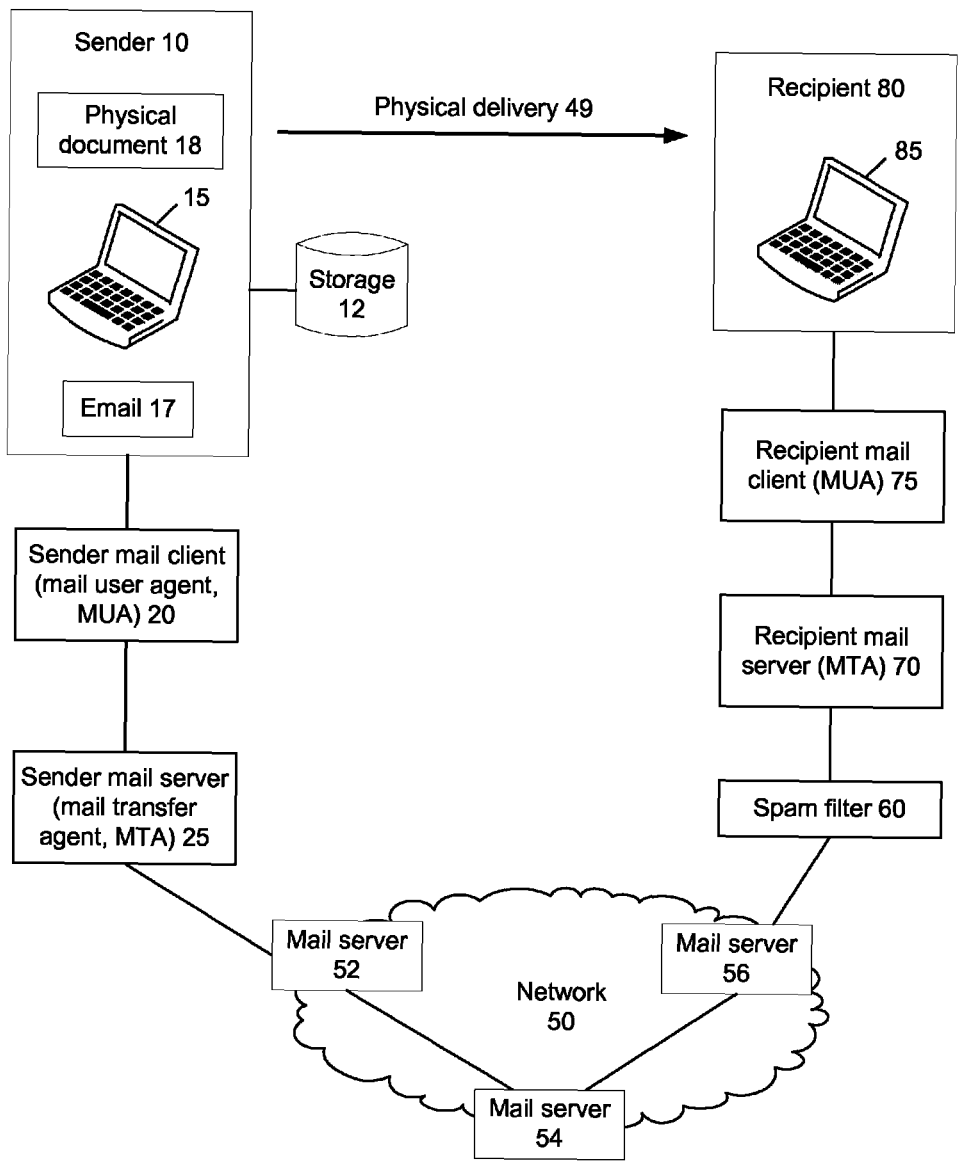
FIG. 1 is a block diagram of an implementation of a system that may be used to provide electronic mail (email) delivery with physical delivery backup.

FIG. 1 is a block diagram of an implementation of a system 5 that may be used to provide electronic mail (email) delivery with physical delivery backup. A sender 10 has an associated computing device 15 on which an electronic communication or email 17 (referred to herein as an email) may be created. The sender 10 may be any entity or institution, such as an individual, a financial services institution, a business, or any corporate entity, for example. A sender mail client 20 (also referred to as a mail user agent (MUA)) and a sender mail server 25 (also referred to as a mail transfer agent (MTA)) are also shown.

The sender 10 may create an email 17 using the sender mail client 20 and may send the email 17 to a recipient 80, e.g., by typing in an email address of the recipient 80 and clicking "send." The sender mail client 20 may comprise an application the sender 10 uses to compose and read email, such as Microsoft Outlook, etc. The sender mail client 20 may also comprise a mail delivery agent (MDA) to which the email 17 may be transferred. The MDA accepts the email 17, then routes it to local mailboxes or forwards the email 17 to the sender mail server 25 if it is not locally addressed. If the email is not locally addressed, the sender mail client 20 formats the message in Internet email format and uses the Simple Mail Transfer Protocol (SMTP) to send the message to the sender mail server 25, e.g., provided by the sender's Internet Service Provider (ISP). SMTP is the de facto standard for email transmissions across the Internet and specifies the protocol by which email is transmitted. SMTP is a text-based protocol in which one or more recipients of a message are specified along with the message text and possibly other encoded objects.

The sender mail server 25 receives the email 17 and forwards it through a network 50. The sender mail server 25 may comprise a computer program or software agent that transfers electronic mail messages from one computer to another.

The network 50, such as the Internet, may comprise mail servers 52, 54, 56. Although only three mail servers are shown, any number of mail servers may be comprised within the network 50. Additionally or alternatively, the network 50 may comprise any number of devices and services, such as domain name system (DNS) servers and routers, for example. These devices and services may slow when processing an unusually heavy load, may temporarily be unable to receive an email when taken down for maintenance, and sometimes may not have identified themselves properly to the Internet through the DNS so that other mail servers in the network 50 are unable to deliver email as addressed. These devices and services, as well as the components on the recipient side (described below) may be protected by firewalls, spam filters and malware detection software that may bounce or even delete an email. A spam filter 60 is shown between the network 50 and the recipient side of the system 5. It is contemplated that a "whitelist" may be used so that an email from a sender such as user or a common carrier, described further herein, may bypass the firewalls, spam filters, and malware detection software. A whitelist is a list of trusted Internet protocol (IP) addresses and domains that allows all mail from these addresses to be delivered. The sender might be whitelisted with ISPs to reduce blocking of electronic delivery to the recipient's email box.

It is contemplated that the network 50 may comprise any type of private or public communication network such as, for example, an intranet, Internet, local area network (LAN), wide area network (WAN), wireless fidelity (WiFi) network, cellular connection, plain old telephone service (POTS), and the like.

In the network 50, the email is routed along a host-to-host chain of mail servers (e.g., mail servers 52, 54, 56). When transferring an email, a sending mail server handles all aspects of mail delivery until the message has been either accepted or rejected by a receiving mail server. Each mail server in the network 50 requests directions from the DNS in order to identify the next mail server in the delivery chain. Parts or all of the path may be specified, deliberately routing a message through a series of mail servers.

To find the recipient's IP address and mailbox, a mail server drills down through the DNS, which consists of a set of servers distributed across the Internet, beginning with the root nameservers at the top-level domain (.tld), then domain nameservers that handle requests for domains within that .tld, and eventually to nameservers that know about the local domain.

For example, the mail server asks the appropriate DNS server which mail exchange (MX) servers have knowledge of the subdomain or local host in the email address. The DNS server responds with an MX record comprising a prioritized list of MX servers for this domain. An MX server is a mail server performing a particular function. To the DNS server, the server that accepts messages is an MX server. When it is transferring messages, it is a mail server. The mail server contacts the MX servers on the MX record in order of priority until it finds the designated host for that address domain. The sending mail server asks if the host accepts messages for the recipient's username at that domain (i.e., username@domain.tld) and transfers the message.

The term mail server is also used to mean a computer acting as an MTA that is running the appropriate software. The term mail exchanger (MX), in the context of the DNS formally refers to an IP address assigned to a device hosting a mail server, and by extension also indicates the server itself.

As shown in FIG. 1, a recipient 80 has an associated computing device 85 on which the email 17 may be received and displayed to the recipient 80. A recipient mail server 70 and a recipient mail client 75 are also shown. After the email 17 is routed through the network 50 and past the spam filter 60, it is accepted for delivery by the recipient mail server 70. The recipient mail server 70 calls a local MDA to deliver the mail to the correct mailbox, where it will sit until it is retrieved by the recipient mail client 75. The recipient 80 may then view the email 17 on the associated computing device 85. For example, the recipient presses the "get mail" button in his MUA, which picks up the message using the Post Office Protocol (POP3). This sequence of events applies to the majority of email users. However, there are many alternative possibilities to the email system.

Although only one sender and one recipient are shown in FIG. 1, it is contemplated that any number of senders and recipients may be included within the system 5. Each computing device 15 and 85 may be a laptop or notebook computer, a handheld computing device such as a personal digital assistant (PDA) or a mobile phone, or any type of personal computer (PC), for example. An example computing device is described with respect to FIG. 7.

Additional networks, such as one or more company networks, may also be included within the system 5. For example, a company network might reside between the sender mail client 20 and the sender mail server 25, and another company network might reside between the recipient mail server 70 and the recipient mail client 75. For example, email service providers and other companies that process a large volume of email often have their own private networks. These organizations commonly have multiple mail servers, and route all email through a central gateway server (i.e., mail hub) that redistributes mail to whichever mail server is available. Email on these secondary mail servers must usually wait for the primary mail server (i.e., the designated host for that domain) to become available, at which time the secondary mail server will transfer its messages to the primary mail server.

Email has a particular format, as specified by Request for Comments (RFC) 2822 for example. Multipurpose Internet Mail Extensions (MIME) supplements the email formatting rules to allow non-English text in both email headers and bodies, and defines a mechanism for including non-textual attachments in email bodies.

Email messages generally comprise a header and a body. The header of an email may contain fields such as summary, sender, receiver, and other information about the email. The header may contain an envelope header which may have information that may be hidden from the sender and/or recipient, and a message header which is usually visible. The body of an email may contain the message itself as unstructured text. The header may be separated from the body by a blank line. Each header field has a name and a value. RFC 2822 specifies the precise syntax. Note that the To field in the header is not necessarily related to the addresses to which the message is delivered. The actual delivery list is supplied in the SMTP protocol, not extracted from the header content. An email wrapper carries metadata. The metadata may contain instructions for generating and sending a physical document 18 to the recipient 80 if the email is not received and/or opened by the recipient 80.

Most email tracking technologies use some form of digitally time-stamped record to reveal the exact time and date that an email was opened, along with the Internet protocol (IP) address of the recipient. A web bug or web beacon is an object that is embedded in an email and is usually invisible to the recipient but allows checking that a recipient has viewed the email, and thus provides a form of email tracking. When the recipient reads the email, the email client requests the image, letting the sender know that the email address is valid and that the email was viewed. However, tracking via web bugs can be prevented by using email clients that do not download images whose uniform resource locators (URLs) are embedded in hypertext markup language (HTML) emails. Many graphical email clients can be configured to avoid accessing remote images. Many modern email readers and email services will not load images when opening an HTML email from an unknown sender or that is suspected to be spam mail. The user must explicitly choose to load images. Web bugs can also be filtered out at the server level so that they never reach the recipient.

As an email passes through the delivery chain from sender to recipient, the mail servers add timestamps, message identifiers, and mail server location information to the email, such as in the envelope header's "received" field. The envelope header may also contain a "return path" field. The return path contains the address of the email sender.

The email 17 may have metadata added to it at the sender computing device 15. The metadata may include information such as a physical address of the recipient 80 and instructions for generating and sending a physical document 18 to the recipient, along with any additional information that the sender chooses to include. In an implementation, the metadata may be encrypted using any known encryption technique(s).

If the email 17 is not successfully delivered to the recipient computing device 85 and/or is not opened after having been delivered, the sender 10 may be apprised, and may store this information in storage, such as storage 12 which may be a database associated with the sender 10. A database associated with and/or used by the sender or a common carrier, described further herein, may contain entries directed to an email or particular content or information for an email, such as an identifier, a creation date, data, a pointer to recipient data or a recipient array of data, etc. The recipient data may contain information directed to a recipient's response to the email 17 and/or the physical document 18.

The sender 10 may generate a physical document 18, e.g., by generating and printing out a document based on the contents of the email 17 using the computing device 15 or another computing device. The physical document 18 may be generated and sent pursuant to instructions and information (e.g., a recipient's physical address) contained within the email 17, such as within a header of the email 17. The sender 10 may send the physical document 18 to the recipient 80 via any physical delivery 49 technique, such as via a postal service or other common carrier. A common carrier is an organization that transports people or goods, and offers its services to the general public. As used herein, a common carrier may be a trusted party, may certify email and/or physical documents, and may provide delivery and receipt services.

In an implementation, the email 17 may be sent via a trusted or certified channel to ensure that the email 17 is not compromised during transmission, and to ensure that the email 17 was properly delivered to the recipient mail client 75 and/or the recipient 80. Additionally or alternatively, the physical document 18 may be sent for physical delivery 49 through a trusted or certified channel, providing the sender 10 with a proof of mailing and a proof of delivery, for example.

Figure 2:
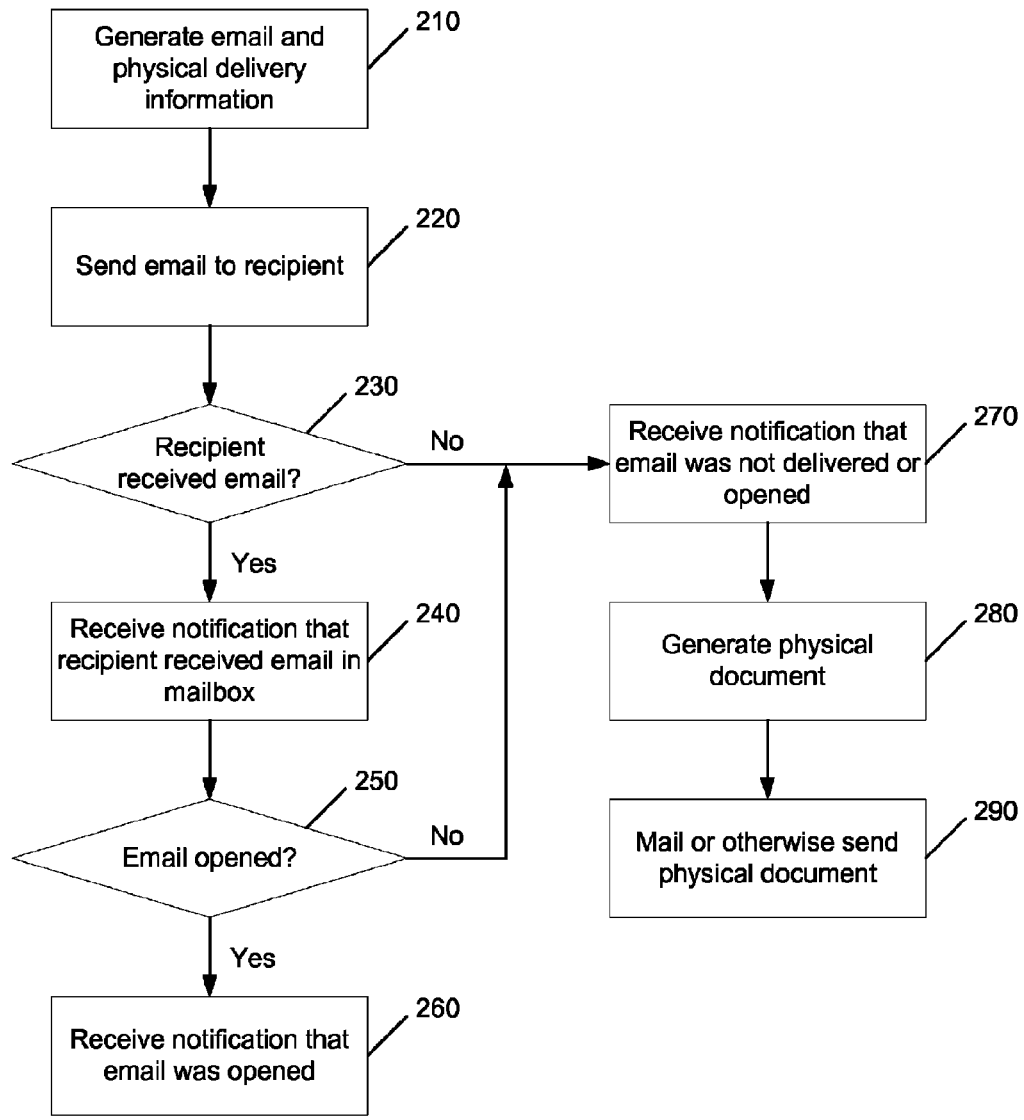
FIG. 2 is an operational flow of an implementation of a method that may be used to provide email delivery with physical delivery backup.

FIG. 2 is an operational flow of an implementation of a method 200 that may be used to provide email delivery with physical delivery backup. An electronic communication, such as an email, may be generated at operation 210 by a sender, for example. Physical delivery information, such as the recipient's physical address and instructions for generating and sending a physical document, may also be generated. The physical delivery information may be added by a sender mail client or other component or application residing on or associated with the sender or sender computing device. In an implementation, the physical delivery information may be included within the email, such as in a header or metadata. The physical delivery information may be encrypted using any known encryption technique(s).

At operation 220, the email may be sent to the recipient. The email may be sent by a user who generated the email or by another user or entity, such as a common carrier. At operation 230, it may be determined if the recipient has received the email in their mailbox. Any known technique(s) for determining if the email has been successfully delivered to the recipient's mailbox may be used. In an implementation, if the recipient reports the email as spam, this may be affirmation of receipt by the recipient. The sender of the email may get a notice of the spam and the notice may be used to confirm receipt by the recipient.

If the email is not successfully delivered (e.g., it bounced because of an incorrect recipient email address or a non-functioning recipient mailbox, etc.), the sender may receive a notification that the email was not successfully delivered, at operation 270. At operation 280, the sender may generate a physical document. The physical document may be generated using instructions associated with or contained within the email that was not successfully delivered. In an implementation, the email that was not successfully delivered may be obtained (e.g., from storage, with a bounce message, etc.) by the sender and the physical delivery information may be retrieved from the email (e.g., by decrypting the header information or metadata). Alternatively or additionally, physical delivery information may have been stored in storage by the sender prior to sending the email, and the physical delivery information may be retrieved and used in the generation of the physical document. At operation 290, the physical document may be sent to the physical address of the recipient using information associated with or contained within the email that was not successfully delivered. The physical document may be sent using any physical delivery technique(s).

If the email has been successfully delivered, then the sender may receive a notification of the successful delivery at operation 240. This provides the sender with a record of a successful delivery. The notification may be stored by the sender, and may be used as evidence to certify that the email was successfully delivered.

At operation 250, it may be determined if the email has been opened using any known technique(s). In an implementation, if it cannot be determined, confirmed, or verified that the email has been opened (e.g., within a predetermined amount of time, such as two days, one week, etc.), processing may continue at operation 270 with the sender being notified and a physical document thereafter being generated and sent to the recipient's physical address.

If the email has been opened (regardless of whether the recipient opened the email or another party opened the email through the recipient's mailbox), then the sender may receive a notification of the email having been opened at operation 260. The notification may be stored by the sender, and may be used as evidence to certify that the email that had been delivered to the recipient's mailbox was opened.

In an implementation, when the recipient opens or downloads the email, a notification may be sent to the sender. The email may contain a mechanism that notifies the sender when it has been delivered, viewed in a preview pane, and/or opened. Mechanisms might include a web beacon, a web bug, a read receipt, and/or a link to a website or content that may be clicked in an email, which are all known and their descriptions are omitted for brevity. In an implementation, the username of the logged in user could be recorded by the software object and transmitted back to the sender.

Figure 3:
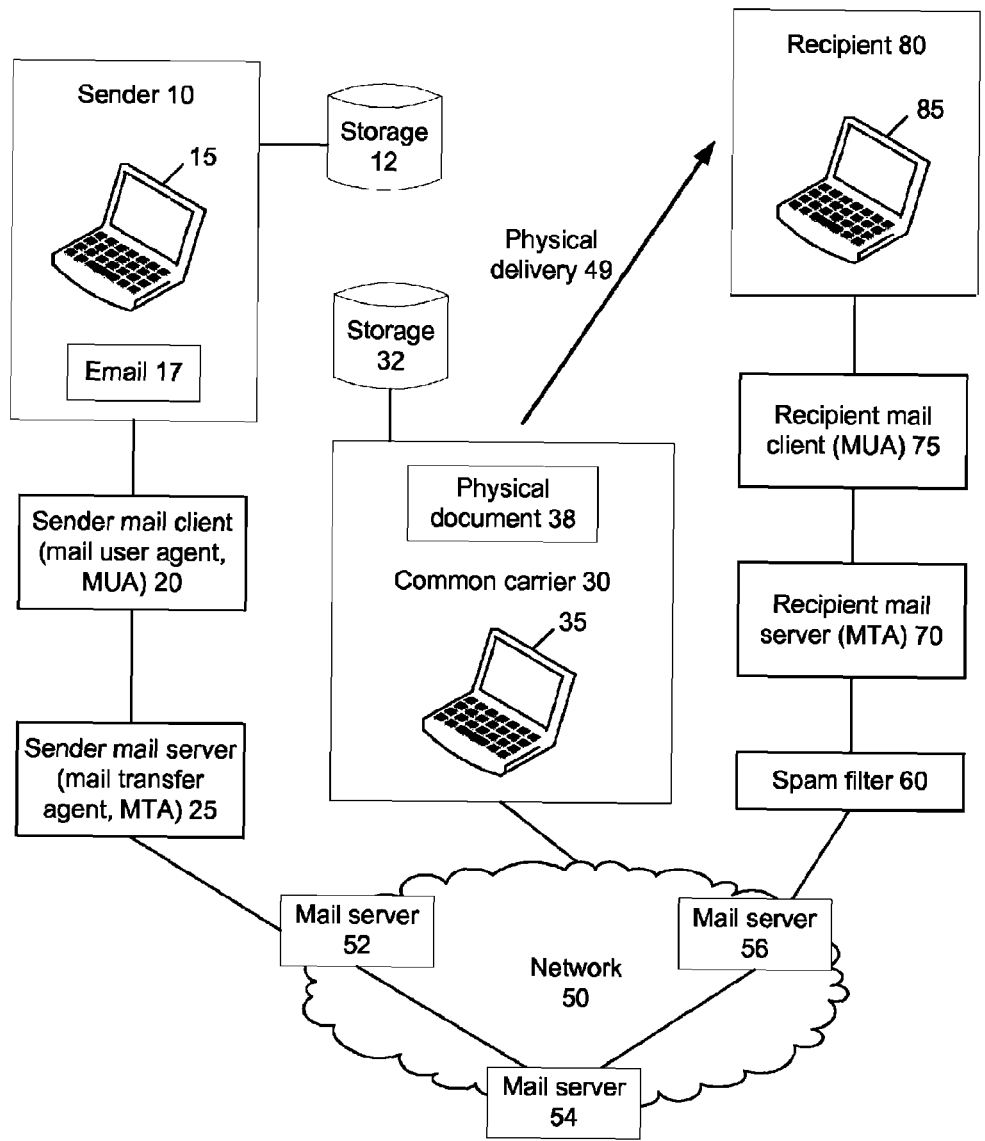
FIG. 3 is a block diagram of another implementation of a system that may be used to provide email delivery with physical delivery backup.

FIG. 3 is a block diagram of another implementation of a system 7 that may be used to provide email delivery with physical delivery backup. The system 7 may comprise elements that are similar to those described with respect to the system 5 of FIG. 1. These elements are labeled identically and their descriptions may be omitted for brevity.

A common carrier 30, such as a postal service or other organization that transports goods, may have a computing device 35 or other computing system and associated storage 32. An example computing device is described with respect to FIG. 7.

In an implementation, if the email 17 is not received by the recipient 80 or opened from the recipient's mailbox, the common carrier 30 may receive notification of the unsuccessful delivery and/opening of the email 17. Such notification may also be provided to the sender 10, who may store the notification in the storage 12, for example. Responsive to receiving the notification, the common carrier 30 may generate a physical document 38 based on the email 17 and instructions contained within the email 17 or previously provided to the common carrier 30 or the storage 32, for example. The common carrier 30 may provide physical delivery 49 of the physical document 38 to the recipient 80, and advise the sender 10.

In an implementation, the common carrier 30 may provide certified, trusted delivery of the physical document 38. Notification of successful physical delivery 49 of the physical document 38 may be stored by the common carrier in the storage 32 and may be stored by the sender 10 in the storage 12, for example.

The common carrier 30 may have a central location from which the physical document 38 may be generated and sent, or may be decentralized. In an implementation in which the common carrier 30 is decentralized (e.g., multiple locations spread throughout an area such as multiple locations in a service area, a city, a state, etc.), a location of the common carrier 30 (e.g., a local office or distribution center) that is near or closest to the recipient's physical address may be determined and that location may generate and send the physical document 38 to the recipient 80.

Figure 4:
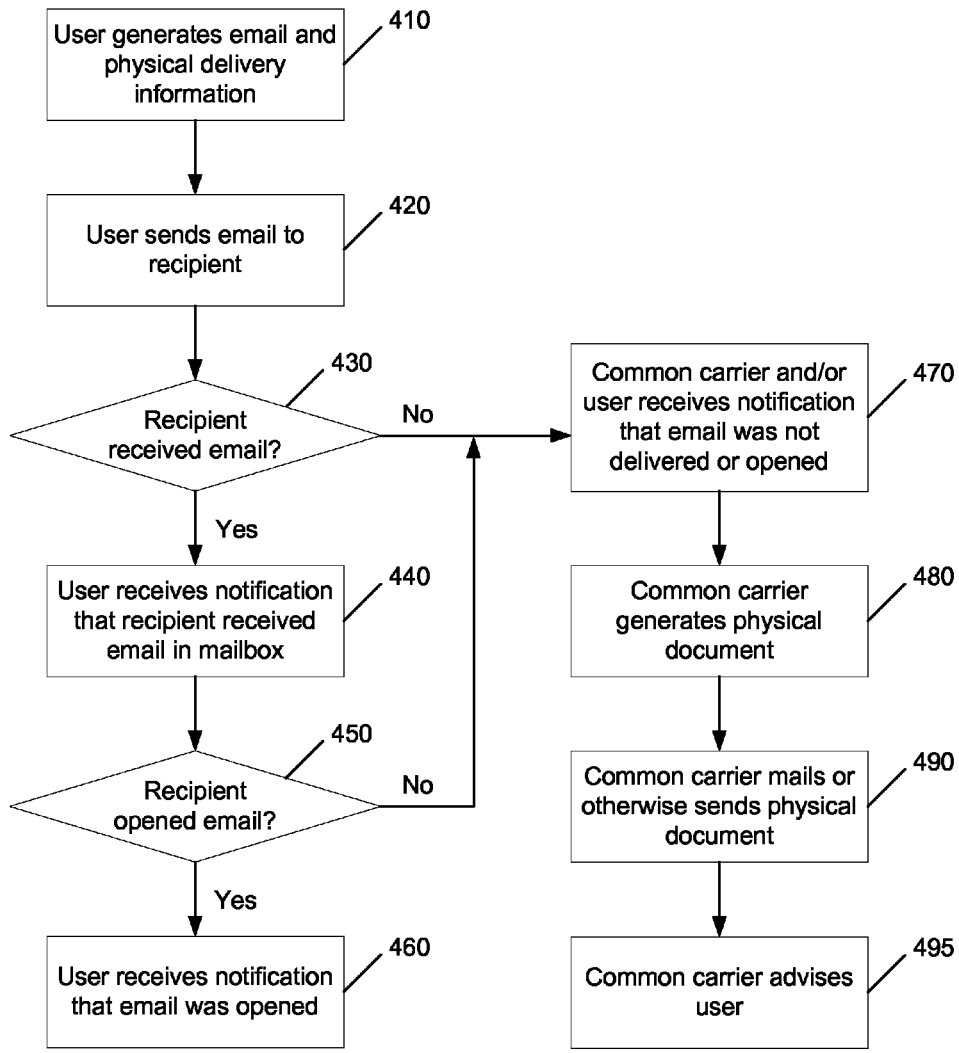
FIG. 4 is an operational flow of another implementation of a method that may be used to provide email delivery with physical delivery backup.

FIG. 4 is an operational flow of another implementation of a method 400 that may be used to provide email delivery with physical delivery backup. As with the method 200, a user (such as a sender 10) may generate an electronic communication, such as an email, along with physical delivery information, at operation 410. At operation 420, the email may be sent to the recipient by the user, and at operation 430, it may be determined if the recipient has received the email in their mailbox. As with the method 200, any known technique(s) for determining if the email has been successfully delivered to the recipient's mailbox may be used.

If the email is not successfully delivered, a common carrier, previously selected by the user for example, may receive a notification that the email was not successfully delivered, at operation 470. Additionally or alternatively, the user may receive a notification regarding the unsuccessful delivery. The common carrier may receive notification directly pursuant to the unsuccessful delivery or may receive notification from the user.

At operation 480, the common carrier may generate a physical document. The physical document may be generated using instructions associated with or contained within the email that was not successfully delivered. In an implementation, the email that was not successfully delivered may be obtained (e.g., from storage, with a bounce message, etc.) by the common carrier (or the user who may provide the email to the common carrier) and the physical delivery information may be retrieved from the email (e.g., by decrypting the header information or metadata). Alternatively or additionally, physical delivery information may have been stored in storage by the user and/or the common carrier prior to sending the email, and the physical delivery information may be retrieved and used in the generation of the physical document.

At operation 490, the physical document may be sent to the physical address of the recipient using information associated with or contained within the email that was not successfully delivered. The physical document may be sent by the common carrier using any physical delivery technique(s). The common carrier may advise the user at operation 495 regarding the physical delivery of the physical document to the recipient.

In an implementation, storage may be provided that is accessible to the common carrier and the user. This storage may be used to store email information, physical document information, and successful and unsuccessful delivery notifications, for example. Thus, in an implementation, the common carrier may receive a notification and store the notification in the storage, which in turn may be accessed by the user for a status update or delivery confirmation purposes, for example.

If the email has been successfully delivered, the user may receive a notification of the successful delivery at operation 440. As with the method 200, the notification may be stored by the user. At operation 450, it may be determined if the email has been opened, using any known technique(s). In an implementation, if it cannot be determined, confirmed, or verified that the email has been opened (e.g., within a predetermined amount of time, such as two days, one week, etc.), processing may continue at operation 470 with the user and/or common carrier being notified and a physical document thereafter being generated and sent to the recipient's physical address.

If the email has been opened (regardless of whether the recipient opened the email or another party opened the email through the recipient's mailbox), then the user may receive a notification of the email having been opened at operation 460. The notification may be stored by the user, and may be used as evidence to certify that the email that had been delivered to the recipient's mailbox was opened.

Figure 5:
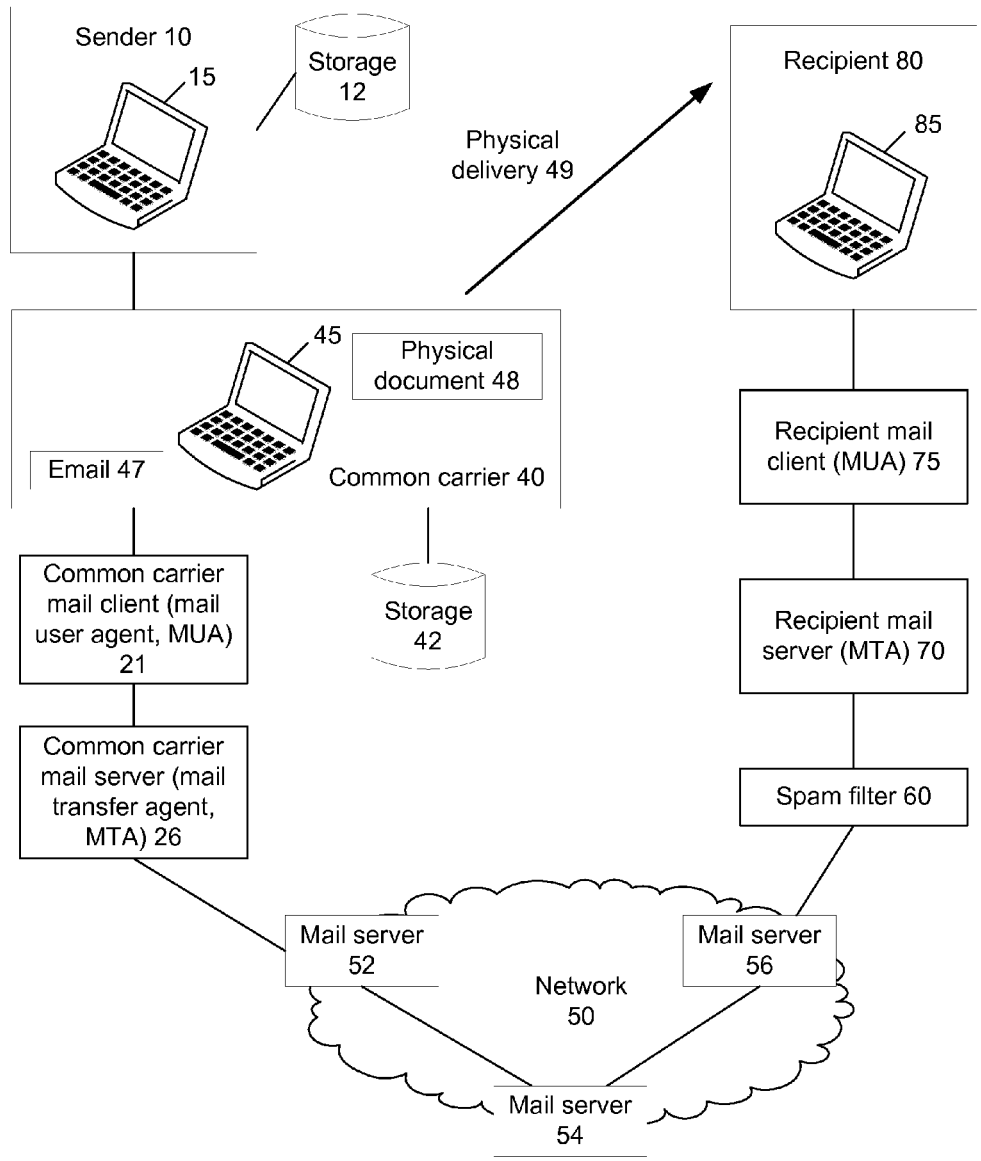
FIG. 5 is a block diagram of another implementation of a system that may be used to provide email delivery with physical delivery backup.

FIG. 5 is a block diagram of another implementation of a system 9 that may be used to provide email delivery with physical delivery backup. The system 9 may comprise elements that are similar to those described with respect to the system 5 of FIG. 1. These elements are labeled identically and their descriptions may be omitted for brevity. A common carrier mail client 21 is provided which is similar to the sender mail client 20, and a common carrier mail server 26 is provided which is similar to the sender mail server 25; however, these elements are associated with the common carrier and thus are labeled differently.

A common carrier 40, such as a postal service or other organization that transports goods, may have a computing device 45 or other computing system and associated storage 42. An example computing device is described with respect to FIG. 7.

In an implementation, the common carrier 40 may receive information pertaining to email content and delivery information (e.g., email delivery information and physical delivery information) from the sender 10. The common carrier 40 may generate an email 47 and send the email 47 to the recipient 80.

If the email 47 is not received by the recipient 80 or opened from the recipient's mailbox, the common carrier 40 may receive notification of the unsuccessful delivery and/opening of the email 47. Notification may also be provided to the sender 10. Responsive to receiving the notification, the common carrier 40 may generate a physical document 48 based on the email 47 and instructions previously provided to the common carrier 40 or the storage 42, for example. The common carrier 40 may provide physical delivery 49 of the physical document 48 to the recipient 80, and advise the sender 10.

As with the system 7 of FIG. 3, in an implementation, the common carrier 40 may provide certified, trusted delivery of the physical document 48. Notification of successful physical delivery 49 of the physical document 48 may be stored by the common carrier in the storage 42 and may be stored by the sender 10 in the storage 12, for example.

The common carrier 40 may have a single location or may have multiple locations (e.g., may be decentralized). In an implementation in which the common carrier 40 is decentralized, the instructions and information from the sender 10 may be received and processed by one location, and one or more other locations of the common carrier 40 may be involved in the generation and sending of the email 47, the monitoring of the delivery and opening of the email 47, and the generation and physical delivery 49 of the physical document 48. In an implementation in which the common carrier 40 is decentralized, a location of the common carrier 40 that is near or closest to the recipient's physical address may be determined and that location may generate and send the email 47 and/or the physical document 48 to the recipient 80. Alternatively, one or more locations of a decentralized common carrier may be determined that are least busy, and the location(s) may service the sender 10, the email 47, and/or the physical document 48.

Figure 6:
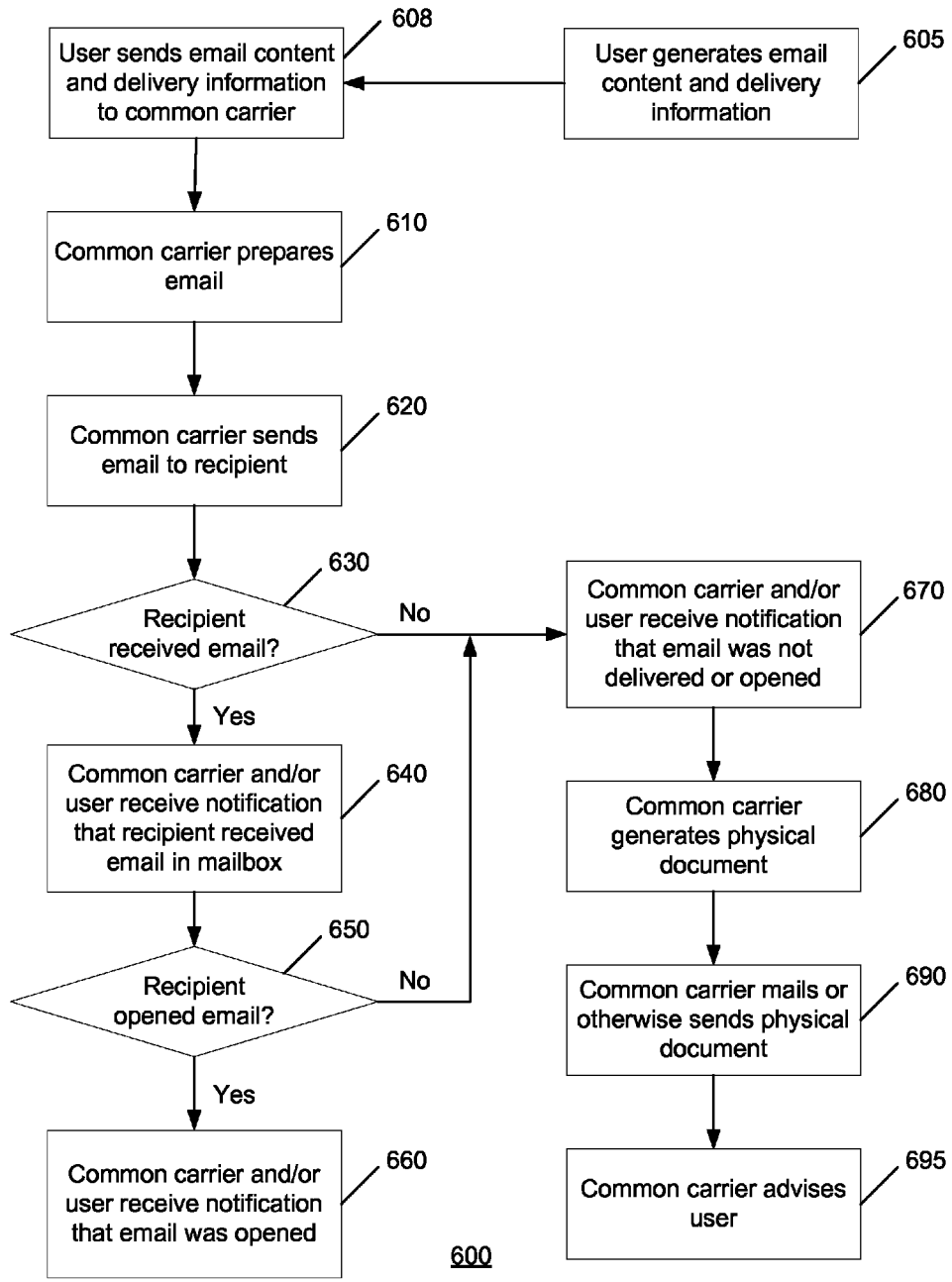
FIG. 6 is an operational flow of another implementation of a method that may be used to provide email delivery with physical delivery backup.

FIG. 6 is an operational flow of another implementation of a method 600 that may be used to provide email delivery with physical delivery backup. A user (such as a sender 10) may generate document content, such as email content, and delivery information, such as recipient name(s), email address(es), and physical address(es), at operation 605. At operation 608, the user may send the content and information to a common carrier. The content and information may be provided in an electronic file, along with instructions to the carrier as to the actions to take with respect to the content and the information. It is contemplated that a recipient may have multiple email and/or physical addresses, and that content and information for multiple recipients may be provided to the common carrier. In an implementation, the electronic file may comprise a template that is provided by the common carrier to the user that the user fills out and returns to the common carrier.

At operation 610, the common carrier may generate an email for a recipient based on the information received from the user, as well as from information that may be in storage that is accessible to the common carrier. The information may have been previously generated and/or received by the common carrier and stored. Additionally or alternatively, the information may have been stored by the user or a third party, if the user or third party had access to the storage.

At operation 620, the common carrier may send the email to the recipient, and at operation 630, it may be determined if the recipient has received the email in their mailbox. As with the method 200, any known technique(s) for determining if the email has been successfully delivered to the recipient's mailbox may be used.

If the email is not successfully delivered, the common carrier may receive a notification that the email was not successfully delivered, at operation 670. Additionally or alternatively, the user may receive a notification regarding the unsuccessful delivery. At operation 680, the common carrier may generate a physical document using instructions associated with or contained within the email that was not successfully delivered. At operation 690, the physical document may be sent to the physical address of the recipient using information associated with or contained within the email that was not successfully delivered. The physical document may be sent by the common carrier using any physical delivery technique(s). The common carrier may advise the user at operation 695 regarding the physical delivery of the physical document to the recipient.

As described with respect to the method 400, storage may be provided that is accessible to the common carrier and the user, and may be used to store email information, physical document information, and successful and unsuccessful delivery notifications, for example.

If the email has been successfully delivered, the common carrier and/or the user may receive a notification of the successful delivery at operation 640. The notification may be stored by the common carrier and/or the user. In an implementation, the common carrier may receive the notification, and may advise the user, e.g., by email, facsimile, text message, telephone, etc., regarding the status of the email delivery.

At operation 650, it may be determined if the email has been opened, using any known technique(s). In an implementation, if it cannot be determined, confirmed, or verified that the email has been opened (e.g., within a predetermined amount of time, such as two days, one week, etc.), processing may continue at operation 670 with the user and/or common carrier being notified and a physical document thereafter being generated and sent to the recipient's physical address.

If the email has been opened (regardless of whether the recipient opened the email or another party opened the email through the recipient's mailbox), then the common carrier and/or the user may receive a notification of the email having been opened at operation 660. The notification may be stored by the common carrier and/or the user, and may be used as evidence to certify that the email that had been delivered to the recipient's mailbox was opened. In an implementation, the common carrier may receive the notification, and may advise the user, e.g., by email, regarding the status of the email being opened.

In an implementation, the common carrier may certify that the content of the email and/or the physical document that the common carrier has generated and/or sent is unaltered.

In an implementation, a common carrier may generate and send an email, and if the email bounces (e.g., is not successfully delivered to the recipient), the common carrier may not generate and send a physical document to the recipient's physical address. Instead, the user or a third party may be notified regarding the unsuccessful delivery, and the user or the third party may generate and send a physical document to the recipient's physical address.

Exemplary Computing Arrangement

Figure 7:
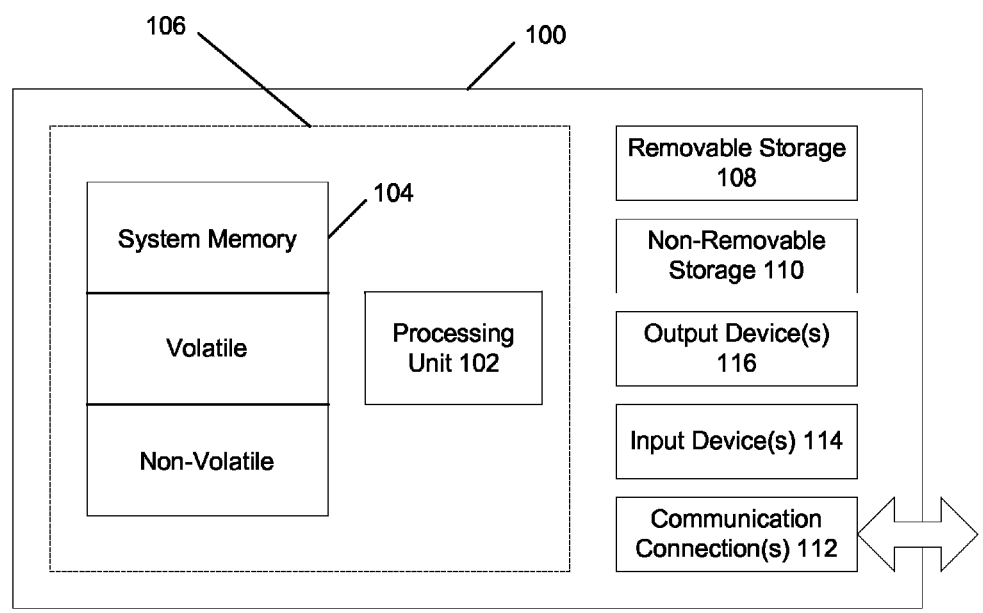
FIG. 7 is a block diagram of an example computing environment in which example embodiments and aspects may be implemented.

FIG. 7 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, PCs, server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 7, an exemplary system for implementing aspects described herein includes a computing device, such as computing device 100. In its most basic configuration, computing device 100 typically includes at least one processing unit 102 and system memory 104. Depending on the exact configuration and type of computing device, system memory 104 may be volatile (such as random access memory (RAM)), non-volatile (such as read-only memory (ROM), flash memory, etc.), or some combination of the two. This most basic configuration is illustrated in FIG. 7 by dashed line 106.

Computing device 100 may have additional features and/or functionality. For example, computing device 100 may include additional storage (removable and/or non-removable) including, but not limited to, magnetic or optical disks or tape. Such additional storage is illustrated in FIG. 7 by removable storage 108 and non-removable storage 110.

Computing device 100 typically includes a variety of computer-readable media. Computer-readable media can be any available media that can be accessed by computing device 100 and include both volatile and non-volatile media, and removable and non-removable media. By way of example, and not limitation, computer-readable media may comprise computer storage media and communication media.

Computer storage media include volatile and non-volatile, and removable and non-removable media implemented in any method or technology for storage of information such as computer-readable instructions, data structures, program modules or other data. System memory 104, removable storage 108, and non-removable storage 110 are all examples of computer storage media. Computer storage media include, but are not limited to, RAM, ROM, Electrically Erasable Programmable Read-Only Memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of computing device 100.

Computing device 100 may also contain communication connection(s) 112 that allow the computing device 100 to communicate with other devices. Communication connection(s) 112 is an example of communication media. Communication media typically embody computer-readable instructions, data structures, program modules, or other data in a modulated data signal such as a carrier wave or other transport mechanism, and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media. The term computer-readable media as used herein includes both storage media and communication media.

Computing device 100 may also have input device(s) 114 such as a keyboard, mouse, pen, voice input device, touch input device, etc. Output device(s) 116 such as a display, speakers, printer, etc. may also be included. All these devices are well known in the art and need not be discussed at length here.

Computing device 100 may be one of a plurality of computing devices 100 inter-connected by a network. As may be appreciated, the network may be any appropriate network, each computing device 100 may be connected thereto by way of communication connection(s) 112 in any appropriate manner, and each computing device 100 may communicate with one or more of the other computing devices 100 in the network in any appropriate manner. For example, the network may be a wired or wireless network within an organization or home or the like, and may include a direct or indirect coupling to an external network such as the Internet or the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A document delivery method, comprising:
   receiving email content from a user;
   generating an email based on the email content;
   sending the email to a computing device associated with a recipient;
   generating a physical document based on the email content if the email fails to be opened at the computing device associated with the recipient within a predetermined amount of time and advising the user if the email fails to be received at the computing device associated with the recipient within the predetermined amount of time;

sending the physical document to a physical address of the recipient; and receiving delivery information from the user, the delivery information comprising the physical address of the recipient, wherein the delivery information is encrypted.

2. The method of claim 1, further comprising certifying the email is being sent via a trusted channel.

3. The method of claim 1, further comprising sending the physical document certified.

4. The method of claim 1, further comprising storing the delivery information in storage, wherein storage includes a database associated with the user.

5. The method of claim 1, wherein advising the user further comprises advising the user if the email fails to be opened at the computing device associated with the recipient.

6. A non-transitory computer-readable storage medium comprising computer-readable instructions for document delivery, said computer-readable instructions comprising instructions that:

receive email content from a user;

generate an email based on the email content;

send the email to a computing device associated with a recipient;

generate a physical document based on the email content if the email fails to be opened at the computing device associated with the recipient within a predetermined amount of time following a time the email is sent and advising the user if the email fails to be received at the computing device associated with the recipient within the predetermined amount of time;

send the physical document to a physical address of the recipient; and receive delivery information from the user, the delivery information comprising the physical address of the recipient, wherein the delivery information is encrypted.

7. The non-transitory computer-readable storage medium of claim 6, wherein the email further includes a header including header content; and further comprising instructions that supply an actual delivery list in simple mail transfer protocol such that the delivery list is not extracted from a header content.

8. The non-transitory computer-readable storage medium of claim 6, further comprising instructions that provide the delivery information within metadata of the email.

9. The non-transitory computer-readable medium of claim 6, wherein the predetermined amount of time follows a time the email is sent.

10. The non-transitory computer-readable storage medium of claim 6, wherein advising the user further comprises instructions that advise the user if the email fails to be opened at the computing device associated with the recipient.

11. A document delivery system, comprising:

at least one subsystem that receives email content from a user;

at least one subsystem that generates an email based on the email content;

at least one subsystem that sends the email to a computing device associated with a recipient;

at least one subsystem that generates a physical document based on the email content if the email fails to be opened at the computing device associated with the recipient within a predetermined amount of time and advising the user if the email fails to be received at the computing device associated with the recipient within the predetermined amount of time;

at least one subsystem that sends the physical document to a physical address of the recipient; and at least one subsystem that receives delivery information from the user, the delivery information comprising the physical address of the recipient, wherein the delivery information is encrypted.

12. The system of claim 11, further comprising at least one subsystem that provides metadata via the email, wherein the metadata includes the physical address of the recipient.

13. The system of claim 12, further comprising at least one subsystem that encrypts the metadata.

14. The system of claim 11, wherein advising the user further comprises at least one subsystem that advises the user if the email fails to be opened at the computing device associated with the recipient.

* * * * *